(12) United States Patent
Esterberg et al.

(10) Patent No.: US 11,774,463 B2
(45) Date of Patent: Oct. 3, 2023

(54) DISPENSER STAGES

(71) Applicant: HEWLETT-PACKARD DEVELOPMENT COMPANY, L.P., Spring, TX (US)

(72) Inventors: Dennis R. Esterberg, Corvallis, OR (US); Christie Dudenhoefer, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 790 days.

(21) Appl. No.: 16/770,198

(22) PCT Filed: Jan. 26, 2018

(86) PCT No.: PCT/US2018/015543
§ 371 (c)(1),
(2) Date: Jun. 5, 2020

(87) PCT Pub. No.: WO2019/147272
PCT Pub. Date: Aug. 1, 2019

(65) Prior Publication Data
US 2020/0292569 A1   Sep. 17, 2020

(51) Int. Cl.
*G01N 35/10*   (2006.01)
*G01N 35/00*   (2006.01)
*B01L 9/00*   (2006.01)

(52) U.S. Cl.
CPC .............. *G01N 35/109* (2013.01); *B01L 9/52* (2013.01); *G01N 35/00029* (2013.01); *G01N 35/1011* (2013.01); *B01L 9/523* (2013.01); *B01L 9/527* (2013.01); *B01L 2200/025* (2013.01); *B01L 2300/0816* (2013.01); *B01L 2300/0822* (2013.01); *B01L 2300/0829* (2013.01); *G01N 2035/00138* (2013.01); *G01N 2035/1039* (2013.01)

(58) Field of Classification Search
CPC .. G01N 35/00; G01N 35/00029; G01N 35/10; G01N 35/109; G01N 35/1011; G01N 2035/00138; G01N 2035/1039; B01L 9/52; B01L 9/523; B01L 9/527; B01L 2200/025; B01L 2300/0816; B01L 2300/0822; B01L 2300/0829
See application file for complete search history.

(56) References Cited

U.S. PATENT DOCUMENTS

| 4,496,657 | A | | 1/1985 | Coppersmith |
| 4,771,593 | A | | 9/1988 | Lee |
| 5,415,060 | A | * | 5/1995 | DeStefano, Jr. ...... B01L 3/5085 74/540 |
| 7,135,146 | B2 | | 11/2006 | Johnson et al. |

(Continued)

FOREIGN PATENT DOCUMENTS

WO   WO-2005042146 A2   5/2005

*Primary Examiner* — Nguyen Q. Ha
(74) *Attorney, Agent, or Firm* — Foley & Lardner LLP

(57) ABSTRACT

In one example, dispenser stages described herein may include a dispenser platform comprising: a stage coupled to a rail system to move the stage in a first plane and a second plane, an alignment feature coupled to the stage to align a substrate nest coupled to the stage with a dispenser positioned above the stage, and a releasable fastener to couple the substrate nest to the stage.

16 Claims, 3 Drawing Sheets

(56) References Cited

U.S. PATENT DOCUMENTS

| | | | |
|---|---|---|---|
| 7,832,292 B2 * | 11/2010 | Thomas | G01N 35/1011 |
| | | | 73/864.23 |
| 8,414,830 B2 | 4/2013 | Jiang | |
| 9,459,272 B2 * | 10/2016 | Kelso | G01N 35/04 |
| 9,527,085 B2 | 12/2016 | Austin et al. | |
| 2002/0037237 A1 | 3/2002 | Mainquist et al. | |
| 2005/0136533 A1 | 6/2005 | Sugiyama et al. | |
| 2005/0226779 A1 | 10/2005 | Oldham et al. | |
| 2009/0054266 A1 | 2/2009 | Hasan | |
| 2009/0141345 A1 | 6/2009 | Tsuchiya | |
| 2015/0277491 A1 | 10/2015 | Browning | |

* cited by examiner

DISPENSER STAGES

CROSS-REFERENCE TO RELATED APPLICATIONS

This Utility Patent Application is a U.S. National Stage filing under 35 U.S.C. § 371 of PCT/US2018/015543, filed Jan. 26, 2018, which is incorporated by reference herein.

BACKGROUND

Media dispensers or fluid dispensers may be utilized to dispense precise quantities of media or fluid. The fluid dispensers may be utilized for dispensing a specific quantity of liquid at a specific location of a substrate. For example, a substrate may include a plurality of wells that may each be utilized separately to perform a separate experiment. In this example, a specific quantity of a particular liquid may be deposited into each of the plurality of wells. In some examples, when a specific well of the plurality of wells is not provided with the specific quantity of the particular liquid an experiment may be compromised.

DETAILED DESCRIPTION

Figure 1:
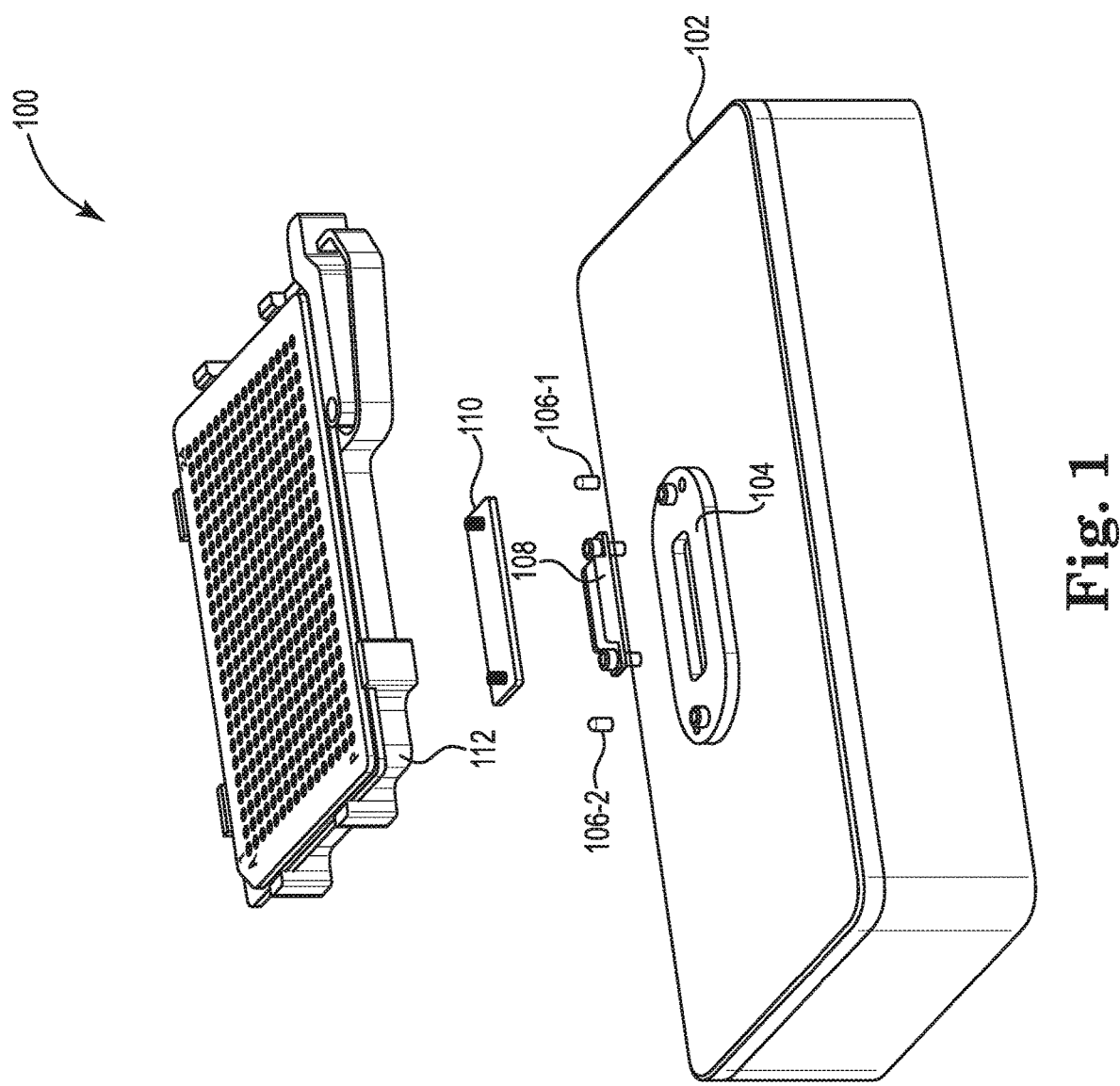
FIG. 1 illustrates an example dispenser stage consistent with the present disclosure.

As described herein, media dispensers or dispenser systems can be utilized to dispense a specific quantity of media or fluid on to a substrate. In some examples, the substrate can be coupled to a substrate nest. The substrate nest can be aligned with and coupled to a stage. In some examples, the stage can be utilized to align the substrate nest and/or substrate coupled to the substrate nest with a dispense head. In some examples, aligning the substrate nest and/or the substrate with the dispense nozzle can allow the media dispensers or dispenser systems to dispense the media or liquid at a specific location or locations on the substrate or substrate nest.

In some examples, the dispenser stages described herein can be utilized to align a plurality of different substrate nests and/or substrates with the dispense nozzle. In this way, a first substrate nest and/or substrate can be removed from the dispenser stage and a second substrate nest and/or substrate can be attached to the dispenser stage and aligned with the dispense nozzle by the dispenser stage. The dispenser stages described herein can provide the flexibility of using a plurality of different substrate nests and/or substrates with the media dispensers or dispenser systems. In addition, each of the plurality of different substrate nests and/or substrates can be aligned with the dispense nozzle by the dispenser stage without adjusting the dispenser stage, substrate nest, and/or substrate.

A number of systems and devices for dispenser stages are described herein. In some examples, dispenser stages described herein may include a dispenser stage comprising: a stage coupled to a rail system to move the stage in a first plane and a second plane, an alignment feature coupled to the stage to align a substrate nest coupled to the stage with a dispenser positioned above the stage, and a releasable fastener to couple the substrate nest to the stage. In some examples, the dispenser stages described herein may be utilized to accept and align a plurality of different substrate nests. In these examples, a plurality of different substrate nests may be utilized with a single dispenser stage. In this way, a single dispenser and dispenser stage may support a plurality of different substrate nests for different uses of the dispenser. As used herein, a substrate nest can include a device for coupling and/or aligning a substrate. As used herein, a substrate can include a material on which a liquid or media is deposited by a dispenser device.

As used herein, a dispenser may include a fluidic dispenser that may dispense a fluid onto a substrate. In some examples, the dispenser may be a digital fluidic dispenser that may dispense a specific quantity of fluid at a specific location of the substrate. For example, the dispenser described herein may include a device that is programmable for dispensing a specific quantity of a liquid on a specific location of a particular substrate positioned on a substrate nest. In this example, the substrate may be changed to a different type of substrate and coupled to the same substrate nest. In this example, the dispenser may be utilized to dispense a specific quantity of liquid at specific locations on the different type of substrate coupled to the substrate nest.

In this way, dispenser stages described herein may be utilized to receive and align a plurality of different substrate nests with a single stage to allow a single dispenser to be utilized with a plurality of different substrates and/or substrate nests without having to realign each of the substrate nests or substrates with the dispense head or nozzle of the dispenser.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example dispenser stage 100 consistent with the present disclosure. In some examples, the dispenser stage 100 may be coupled to a dispenser device. For example, the dispenser device may include a dispense head for dispensing a media or liquid on to the dispenser stage 100.

In some examples, the dispenser stage 100 may be coupled to a rail system of the dispenser device to move the dispenser stage 100 in a first plane (e.g., x-direction, a first direction, etc.) and a second plane (e.g., y-direction, a second direction, etc.). In some examples, a dispense head or nozzle of the dispenser device may be in a fixed position in relation to the first plane and the second plane. That is, the dispense head of the dispenser device may not be able to move in the first plane or the second plane. In these examples, the rail system of the dispenser device may move to a specific location such that the dispense head of the dispenser device may deposit a quantity of fluid on the specific location without having to move along the first plane or the second plane.

In some examples, the dispenser stage 100 may include a stage 102 coupled to a base. In some examples, the stage 102 may be a platform for supporting other elements of the dispenser stage 100. In some examples, the stage 102 may be coupled to a base portion that may cover or enclose a rail system of the dispenser device. In some examples the base or the stage 102 may be coupled to the rail system of the dispenser device such that the rail system may move the stage 102 in the first plane and/or second plane as described herein.

In some examples, the dispenser stage 100 may include a fastener plate 104. In some examples, the fastener plate 104 may be coupled to the surface of the stage 102. In some examples, the fastener plate 104 may be permanently or semi-permanently coupled to the surface of the stage 102. For example, the fastener plate 104 may be permanently coupled to the surface of the stage 102 utilizing a welding technique. In another example, the fastener plate 104 may be semi-permanently coupled to the surface of the stage 102 utilizing an attachment device such as a screw or bolt that may pass through apertures of the fastener plate 104 and be received by apertures or threaded apertures of the stage 102.

In some examples, the dispenser stage 100 may include a releasable fastener such as a magnetic fastener 108. In some examples, the magnetic fastener 108 may be coupled to the fastener plate 104. In some examples, the fastener plate 104 may include a slot to receive the magnetic fastener 108. In some examples, the slot may be an aperture that exposes a portion of the stage 102 to couple the magnetic fastener 108 to the stage 102 while the slot surrounds the magnetic fastener 108. For example, the slot may be the same or similar shape as the magnetic fastener 108 to allow the magnetic fastener 108 to be more flush with a surface (e.g. level with the surface, even with the surface, etc.) of the fastener plate 104. In addition, the slot surrounding the magnetic fastener 108 may ensure that the magnetic fastener does not move relative to the fastener plate 104 in the first plane or the second plane as described herein. In some examples, the magnetic fastener 108 can be replaced with a different type of releasable fastener. For example, the fastener can include an aperture to receive a screw to couple a substrate nest 112 from the plurality of different substrate nest types to the stage 102.

In some examples, the magnetic fastener 108 may be permanently or semi-permanently coupled to the surface of the stage 102. For example, the magnetic fastener 108 may be permanently coupled to the surface of the stage 102 by a welding technique. In another example, the magnetic fastener 108 may be semi-permanently coupled to the surface of the stage 102 with a number of screws or bolts that may pass through a number of apertures of the magnetic fastener 108 and be received by a number of apertures or threaded apertures of the stage 102. In this example, the number of screws or bolts may couple the magnetic fastener 108 to the stage 102 and prevent the magnetic fastener 108 from moving in a z-plane (e.g., upward direction as illustrated in FIG. 1, direction away from the stage 102, etc.). In this example, the slot of the fastener plate 104 may prevent the magnetic fastener 108 from moving in an x-plane along the surface of the stage 102 or a y-plane along the surface of the stage 102.

In some examples, the dispenser stage 100 may include a ferromagnetic fastener 110. In some examples, the ferromagnetic fastener 110 may include a plate that is coupled to a substrate nest 112 such that a position of the ferromagnetic fastener 110 corresponds to a position of the magnetic fastener 108. As used herein, the ferromagnetic fastener 110 includes a plate that comprises a ferromagnetic material. As used herein, a ferromagnetic material is a material that is attracted to a magnet. As used herein, a magnet is a material that produces a magnetic field that may attract or alter a position of a ferromagnetic material (e.g., iron, nickel, cobalt, alloys of rare-earth metals, etc.). In some examples, the ferromagnetic fastener 110 can be replaced with a plate that can include a number of apertures to receive a screw or bolt to couple the fastener to the substrate nest 112.

In some examples, the ferromagnetic fastener 110 may be permanently or semi-permanently coupled to a particular side of a substrate nest 112. For example, the ferromagnetic fastener 110 may be coupled to a bottom side as illustrated in FIG. 1 or side of the substrate nest 112 that does not include a substrate. In some examples, each of a plurality of different substrate nests may include a ferromagnetic fastener 110 that is positioned to align a substrate nest (e.g., substrate nest 112, etc.) with the magnetic fastener 108.

In some examples, the dispenser stage 100 may include a number of alignment features 106-1, 106-2, collectively referred to as alignment features 106. In some examples, the alignment features 106 may include pins or cylindrical structures. For example, the alignment features 106 may be cylindrical pins that may be positioned within corresponding apertures of the fastener plate 104. In this example, the pins may be permanently or semi-permanently coupled within the apertures of the fastener plate 104 such that a portion of the pins are exposed and protrude above the surface of the fastener plate 104. In this example, the exposed portion of the pins may be received by corresponding apertures of the substrate nest 112. That is, the alignment features 106 may align the substrate nest 112 at a specific location and orientation with the stage 102. That is, the alignment features 106 may be positioned between the stage 102 and the substrate nest 112.

In some examples, the alignment features 106 may reposition the substrate nest 112 when the ferromagnetic fastener 110 interacts and is coupled to the magnetic fastener 108. For example, the alignment features 106 may prevent the substrate nest 112 from being out of alignment. In this example, the alignment features 106 may prevent a coupling between the substrate nest 112 and the stage 102 when the alignment features 106 are not aligned with corresponding apertures of the substrate nest 112.

In this way, a substrate nest 112 may be coupled and aligned simultaneously utilizing the magnetic fastener 108 and the alignment features 106. In a similar way, the substrate nest 112 may be removed by applying a force that is stronger than a force between the magnetic fastener 108 and the ferromagnetic fastener 110 and a different substrate nest may be coupled in a similar way. Thus, the dispenser stage 100 may be utilized to couple and align a plurality of different substrate nests (e.g., substrate nest 112, etc.) to be utilized with a dispenser device as described herein.

Figure 2:
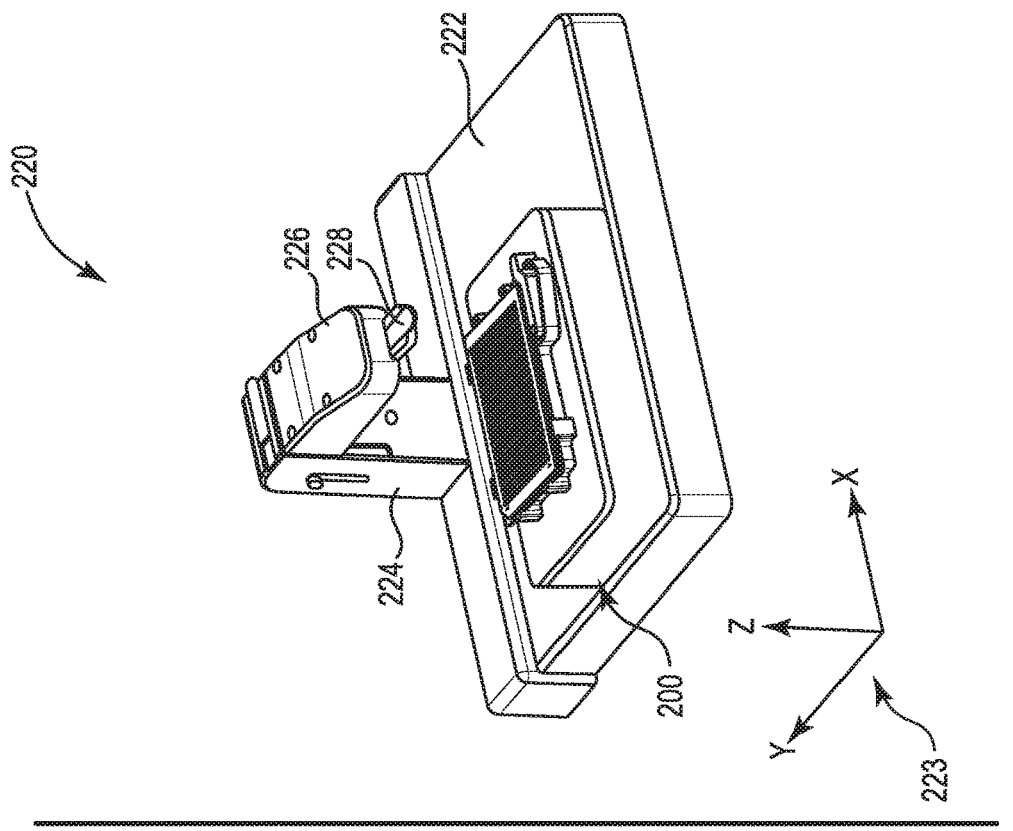
FIG. 2 illustrates an example dispenser stage and an example system for a dispenser stage consistent with the present disclosure.
Figure 2:
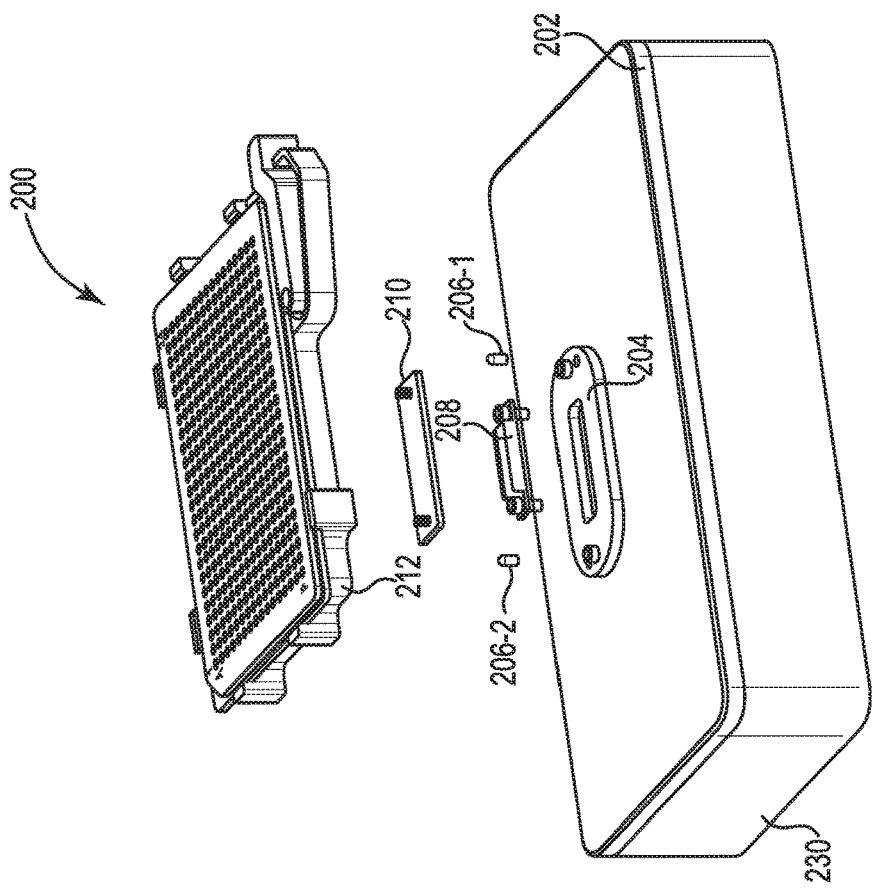

FIG. 2 illustrates an example dispenser stage 200 and an example system 220 for a dispenser stage 200 consistent with the present disclosure. In some examples, the dispenser stage 200 may be utilized with the system 220. In some examples, the system 220 may be utilized as a dispenser device. For example, the system 220 may be utilized to deposit a fluid or media on to a surface of a substrate coupled to the substrate nest 212 as described herein.

In some examples, the substrate nest 212 is coupled at a specific location and orientation of the stage 202 such that the fluid or media deposited on the surface of the substrate of the substrate nest 212 are deposited at a correct location on the substrate. For example, the substrate nest 212 may be a nest for a microtiter well plate substrate that includes a plurality wells that can each receive a fluid from a dispense head 228 of the system 220. As used herein, a dispense head 228 can include a single nozzle to dispense a liquid or media and/or the dispense head 228 can include a plurality of nozzles that can dispense the liquid or media. In this example, the substrate nest 212 may be aligned in a specific location and orientation of the stage 202 as described herein such that the system 220 may deposit a fluid or media at a specific well of the microtiter well plate substrate coupled to the substrate nest 212.

In some examples, the substrate nest 212 may be coupled to the stage 202 as described herein. For example, the substrate nest 212 may be coupled to a ferromagnetic fastener 210 that may interact with a magnetic fastener 208 when the magnetic fastener 208 is coupled to the stage 202 within a slot of a fastener plate 204 that is coupled to the stage 202. As described herein, the fastener plate 204 may include a number of apertures to receive corresponding alignment features 206-1 206-2, referenced herein as alignment features 206.

In some examples, the alignment features 206 may align a plurality of different substrate nest types with the dispenser dispense head 228 positioned above the stage 202. As used herein, the dispense head 228 is positioned above the stage 202 when a height of the dispense head 228 is greater than a height of the stage 202. In some examples, a height of a nozzle or dispense head 228 may be adjustable based on a substrate nest type. In some examples, the alignment features 206 may include dowel pins. For example, the stage 202 may include an aperture of the fastener plate 204 to receive a plurality of dowel pins. As used herein, a dowel pin may include a pin, usually round or cylindrical, fitting into holes in two adjacent pieces to prevent their slipping or to align the two adjacent pieces. In some examples, the plurality of dowel pins may act as the alignment feature 206 to align a substrate nest 212 from the plurality of different substrate nest types with the dispense head 228 as illustrated in system 220.

As described herein, the alignment features may be positioned within the apertures of the fastener plate 204 and protrude from the surface of the fastener plate 204 to receive corresponding apertures of the substrate nest 212 to align the substrate nest 212 with the stage 202. In this way, the substrate of the substrate nest 212 may be aligned with a specific location of the stage 202 to allow the system 220 to precisely deposit a fluid or media at specific locations on the substrate of the substrate nest 212. In addition, the alignment features 206 may align a plurality of different substrate nests (e.g., substrate nest 212, etc.) to be utilized with the same stage 202 of the system 220.

In some examples, the system 220 may be a dispenser device as described herein. For example, the system 220 may be utilized to deposit fluid or media on a substrate that is coupled to a substrate nest 212 as described herein. In some examples, the system 220 may include a platform 222 that may act as a base for the system 220. The platform 222 may include a slot below an enclosure of the stage 202.

In some examples, the slot of the platform 222 may connect the dispenser stage 200 to a rail system for moving the dispenser stage 200 in across the platform 222. For example, the rail system may move the dispenser stage 200 in an x-plane or x-direction as illustrated by the compass 223 and/or the rail system may move the dispenser stage 200 in a y-plane or y-direction as illustrated by the compass 223. In this way, the rail system may move the dispenser stage 200 to specific locations on the platform 222 to receive deposited fluid or media from a dispense head 228 of the system positioned above the dispenser stage 200.

In some examples, the system 220 may include a pillar 224 coupled to the platform 222. In some examples, the pillar 224 may raise a position of a bridge 226 coupled to the pillar 224. In some examples, the pillar 224 may be coupled to the bridge 226 to extend a dispense head 228 of the system 220 over a position of the platform 222. In some examples, the pillar 224 may be utilized to adjust a height of the bridge 226 and/or adjust the height of the dispense head 228 compared to a level of the platform 222 and/or substrate nest 212. In some examples, the pillar 224 may be utilized to move the bridge 226 and/or the dispense head 228 in a z-plane or z-direction as illustrated by the compass 223.

In some examples, the system 220 may be utilized to deposit a specific quantity of liquid or media at a specific location on a substrate coupled to the substrate nest 212 of the dispenser stage 200. For example, the substrate nest 212 may be a well plate substrate nest that can couple a well plate substrate (e.g., microtiter well plate, etc.) that includes a plurality of wells that may hold a particular quantity of liquid. In this example, the plurality of wells of the well plate substrate may be relatively close to other wells. In this example, the height of the dispense head 228 may be adjusted by the pillar 224 to avoid spillage of liquid or media from a first well of the plurality of wells to a second well of the plurality of wells.

In some examples, the dispenser stage 200 can include a stage 202 coupled to a rail system to move the stage 202 along a first plane and a second plane of a platform 222, a fastener coupled to the stage to couple a plurality of different substrate nest types to the stage 202, and an alignment feature 206 to align each of the plurality of different substrate nest types with the stage 202 and a microfluidic dispenser (e.g., system 220, etc.), wherein the microfluidic dispenser is adjustable along a third plane based on a substrate nest type coupled to the stage 202.

As described herein, the dispenser stage 200 may be utilized to receive and align a plurality of different substrate nests and/or receive and align a plurality of different types of substrate nests that can be utilized to couple different types of substrates. For example, the dispenser stage 200 may be utilized to receive and align a well plate substrate nest, a dish substrate nest, a flat bottom container substrate nest, a microscope slide substrate nest, a paper substrate nest, a Petri dish substrate nest, and/or other types of substrate nests that may be utilized to receive the fluid or media from the dispense head 228 of the system 220. As described herein, the system 220 may determine the type of substrate nest coupled to the dispenser stage 200 and alter a height of the bridge 226 or dispense head 228 based on the type of substrate nest. In addition, the alignment features 206 may be utilized to align the particular type of substrate nest coupled to the dispenser stage 200 to be positioned to receive the fluid or media dispensed by the dispense head 228.

In some examples, the system 220 may be a microfluidic dispenser that may include a computing device to deposit a specific quantity of fluid or media at a specific location on a substrate of the substrate nest 212. In addition, a substrate nest 212 may be non-mechanically removed (e.g., removed without tools, removed without removing mechanical devices such as screws or bolts, etc.) from the stage 202 and replaced with a different substrate nest (e.g., substrate nest different than substrate nest 212, etc.) that is aligned by the alignment features 206 as described herein. Thus, the system 220 may change the type of substrate nest 212 coupled to the stage 202 and align the substrate nest 212 coupled to the stage 202 more quickly and easily compared to previous systems and methods that utilize mechanical devices to couple and align a substrate nest 212 to a stage 202.

Figure 3:
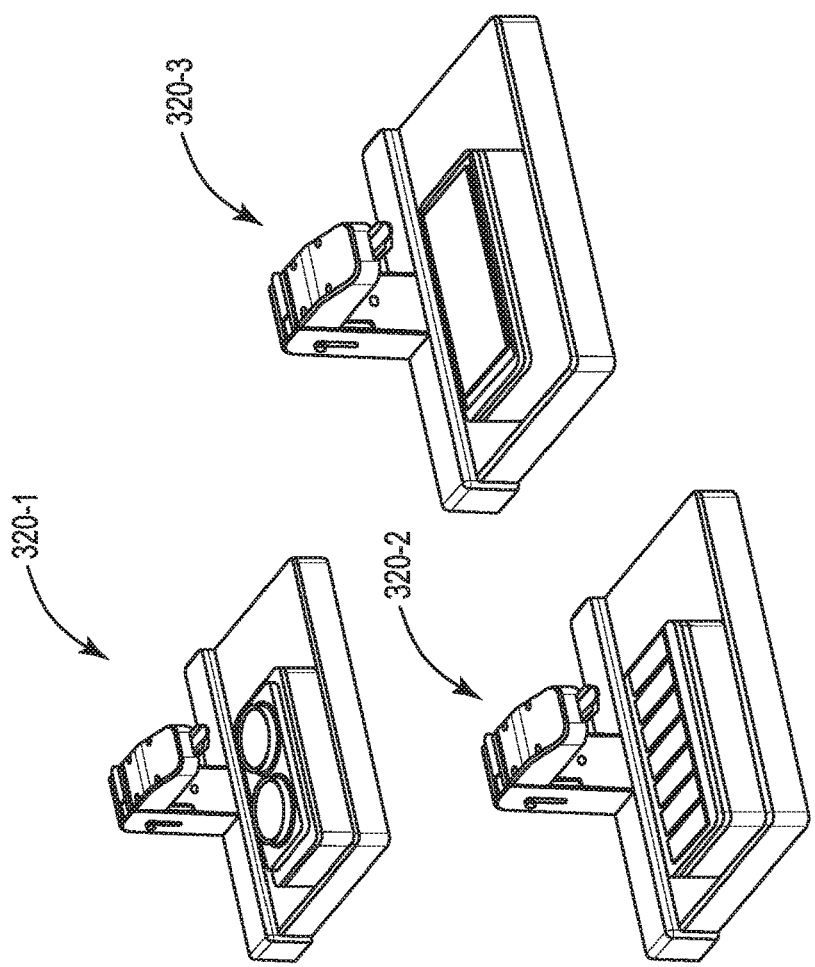
FIG. 3 illustrates an example dispenser stage and an example system for a dispenser stage consistent with the present disclosure.
Figure 3:
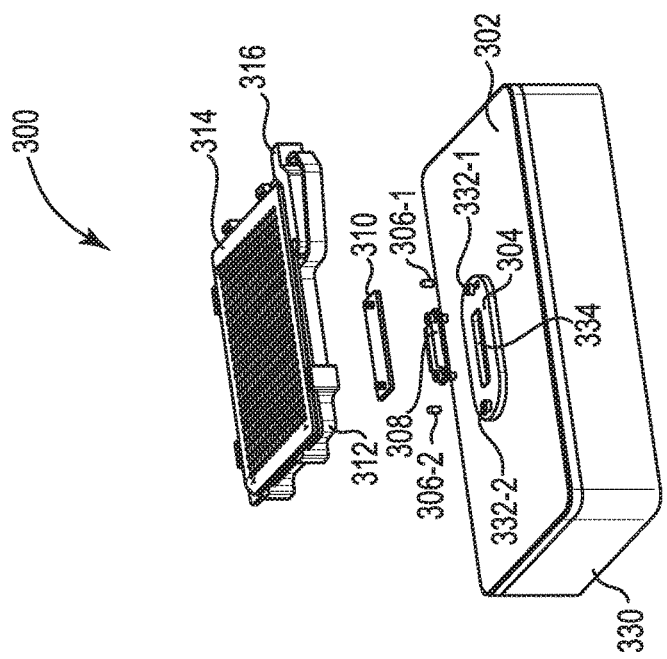

FIG. 3 illustrates an example dispenser stage 300 and an example system 320-1, 320-2, 320-3 for a dispenser stage consistent with the present disclosure. In some examples, the dispenser stage 300 may be the same or similar as dispenser stage 100 as referenced in FIG. 1 and/or dispenser stage 200 as referenced in FIG. 2. In some examples, the dispenser stage 300 may be utilized with the system 320-1, 320-2, 320-3, collectively referenced as system 320. In some examples, the system 320 may be utilized as a dispenser device. For example, the system 320 may be a microfluidic dispenser that may be utilized to deposit a fluid or media on to a surface of substrate 314 coupled to a substrate nest 312 as described herein.

As described herein, the substrate nest 312 may be coupled at a specific location and orientation of the stage 302 such that the fluid or media deposited on the surface of the substrate 314 coupled to the substrate nest 312 are deposited at a correct location on the substrate 314. For example, the substrate nest 312 may be a well substrate nest that can couple a well plate substrate 314 that includes a plurality wells that may each receive a fluid from a dispense head or nozzle of the system 320. In this example, the substrate nest 312 may be aligned in a specific location and orientation of the stage 302 as described herein such that the system 320 may deposit a fluid or media at a specific well of the well plate substrate 314 coupled to the substrate nest 312. A used herein, an orientation of the substrate nest 312 may include an angle of the substrate nest 312 compared to a position of the stage 302 and/or platform of the system 320.

In some examples, the substrate nest 312 may be coupled to the stage 302 as described herein. For example, the substrate nest 312 may be coupled to a ferromagnetic fastener 310 that may interact with a magnetic fastener 308 when the magnetic fastener 308 is coupled to the stage 302 within a slot 334 of a fastener plate 304 that is coupled to the stage 302. As described herein, the fastener plate 304 may include a number of apertures 332-1, 332-2, referenced herein as apertures 332 to receive corresponding alignment features 306-1 306-2, referenced herein as alignment features 306.

As described herein, the alignment features 306 may be positioned within the apertures 332 of the fastener plate 304 and protrude from the surface of the fastener plate 304 to receive corresponding apertures of the substrate nest 312 to align the substrate nest 312 with the stage 302. In this way, the substrate 314 of the substrate nest 312 may be aligned with a specific location of the stage 302 to allow the system 320 to precisely deposit a fluid or media at specific locations on the substrate 314 of the substrate nest 312.

In addition, the alignment features 306 may align a plurality of different substrate nests (e.g., substrate nest 312, etc.) to be utilized with the same stage 302 of the system 320. For example, system 320-1 may illustrate a dispenser device utilizing a dish or Petri dish substrate nest type that can couple a number of Petri dish substrates, system 320-2 may illustrate a dispenser device utilizing a slide substrate nest type (e.g., microscope slide substrate nest, etc.) to couple a number of slide substrates, and system 320-3 may illustrate a dispenser device utilizing a paper media substrate nest type to couple media substrates. As described herein, the alignment features 306 may align each of the different substrate nest types such that the location and orientation of a substrate nest 312 and/or the location and orientation of the substrate 314 is aligned with a location where a dispense head or nozzle of the system 320 is depositing a particular quantity of fluid as described herein.

In some examples, the system 320 may be a dispenser device as described herein. For example, the system 320 may be utilized to deposit fluid or media on to a substrate 314 of the substrate nest 312 coupled to a stage 302 as described herein. In some examples, the system 320 may include a platform that may act as a base for the system 320.

In some examples, a slot of the platform may connect the dispenser stage 300 to a rail system for moving the dispenser stage 300 across the platform as described herein. In this way, the rail system may move the dispenser stage 300 to specific locations on the platform to receive deposited fluid or media from a dispense head of the system 320 positioned above the dispenser stage 300. As described herein, a pillar may be coupled to a bridge to extend a dispense head of the system 320 over a position of the platform. In some examples, the pillar may be utilized to adjust a height of the bridge and/or adjust the height of the dispense head compared to a level of the platform and/or substrate nest 312.

In some examples, the system 320 may be utilized to deposit a specific quantity of liquid or media at a specific location on the substrate 314 of the substrate nest 312 of the dispenser stage 300. For example, the substrate nest 312 may be a well plate substrate nest 314 that can couple a well plate substrate 314 that includes a plurality of wells that may hold a particular quantity of liquid. In this example, the plurality of wells of the well plate substrate 314 may be relatively close to other wells. In this example, the height of the dispense head may be adjusted to avoid spillage of liquid or media from a first well of the plurality of wells to a second well of the plurality of wells.

In some examples, the dispenser stage 300 can include a latch 316 to couple a substrate 314 to the substrate nest 312. In some examples, the latch 316 can be utilized to align the substrate 314 with the substrate nest 312. In some examples, a latch 316 may be utilized to secure a well plate substrate that includes a plurality of wells to a specific position of the substrate nest 312. In some examples, the latch 316 may be a loaded latch (e.g., spring loaded, etc.) that may release a well plate substrate 314 from the substrate nest 312 by applying pressure on the latch 316. In some examples, the latch 316 may be coupled to the substrate nest 312. In some examples, different types of substrate nests (e.g., substrate nest 312, etc.) may include similar latching devices for securing or positioning particular substrates (e.g., substrate 314, etc.) to the substrate nest. For example, a dish substrate nest as illustrated in system 320-1 may include a latching device that includes a recessed portion to receive a particular dish. In this example, the particular dish may be a Petri dish that may be positioned within the recessed portion. In some examples, the latch 316 can be a substrate holder coupled to the removable substrate nest 312 to align a substrate 314 at a particular location on the removable substrate nest 312.

In these examples, the recessed portion may couple a corresponding dish in a specific location such that the system 320-1 may identify a specific location for depositing the liquid or media at the specific location. For example, the specific location of the recessed portion may be a known location or programmed location to a computing device of the system 320-1. In this example, the known location may be utilized for depositing a specific quantity of fluid or media at a specific location within the dish or Petri dish.

As described herein, the dispenser stage 300 may be utilized to receive and align a plurality of different substrate nests and/or a plurality of different types of substrate nests. For example, the dispenser stage 300 may be utilized to receive and align a well plate substrate nest to couple a well plate substrate 314 as illustrated on the dispenser stage 300, a dish substrate nest to couple a dish substrate as illustrated by system 320-1, a microscope slide substrate nest to couple a microscope slide substrate as illustrated by system 320-2, a media substrate nest to couple media substrate as illustrated by system 320-3, and/or other types of substrate nests that may be utilized to couple a substrate to receive the fluid or media from the dispense head of the system 320.

As described herein, the system 320 may determine the type of substrate nest 312 and/or substrate 314 coupled to the dispenser stage 300 and alter a height of the bridge or dispense head based on the type of substrate nest 312 or type of substrate 314 coupled to the substrate nest 312. In addition, the alignment features 306 may be utilized to align the particular type of substrate nest 312 coupled to the dispenser stage 300 to position the substrate 314 to receive the fluid or media dispensed by the dispense head.

In some examples, the dispenser stage 300 may include a base enclosure 330 with a platform (e.g., platform 222 as referenced in FIG. 2), a stage 302 coupled to a rail system to move the stage 302 in a first direction and a second direction across the platform, a retention device (e.g., fastener device or fastener system as described herein) coupled to the stage 302, a plurality of alignment features 306 coupled to a corresponding plurality of apertures 332-1, 332-2 of the stage 302, and a removable substrate nest 312 coupled to the retention device and aligned with a microfluidic dispenser dispense head (e.g., dispense head 228 as illustrated in FIG. 2, nozzle, plurality of nozzles, etc.) by the plurality of alignment features 306.

In some examples, the system 320 may be a microfluidic dispenser that may include a computing device to deposit a specific quantity of fluid or media at a specific location on a substrate 314 coupled to a substrate nest 312. In addition, a substrate nest 312 may be non-mechanically removed (e.g., removed without tools, removed without removing mechanical devices such as screws or bolts, etc.) from the stage 302 and replaced with a different substrate nest that is aligned by the alignment features 306 as described herein. Thus, the system 320 may change the type of substrate nest 312 coupled to the stage 302 and align the substrate 314 of the substrate nest 312 coupled to the stage 302 more quickly and easily compared to previous systems and methods that utilize mechanical devices to couple and align a substrate nest 312 with a stage 302.

The above specification, examples and data provide a description of the method and applications, and use of the system and method of the present disclosure. Since many examples may be made without departing from the spirit and scope of the system and method of the present disclosure, this specification merely sets forth some of the many possible example configurations and implementations.

What is claimed:

1. A dispenser platform, comprising:
a stage coupled to a rail system to move the stage in a first plane and a second plane;
an alignment feature coupled to the stage to align a substrate nest coupled to the stage with a dispenser positioned above the stage; and
a releasable fastener to couple the substrate nest to the stage, wherein the releasable fastener includes:
a first fastener coupled to the substrate nest; and
a second fastener coupled to the stage, the second fastener to interact with the first fastener to couple the substrate nest to the stage.

2. The dispenser platform of claim 1, wherein the alignment feature is positioned between the stage and the substrate nest.

3. The dispenser platform of claim 1, wherein the alignment feature aligns a plurality of different substrate nest types with a dispense head of the dispenser positioned above the stage.

4. The dispenser platform of claim 3, wherein a height of the dispense head is adjustable based on a substrate nest type of the substrate nest coupled to the stage.

5. The dispenser platform of claim 3, wherein the plurality of different substrate nest types include a well plate substrate nest to couple a well plate substrate, a Petrie dish substrate nest to couple a Petrie dish substrate, a microscope slide nest to couple a number of microscope slide substrates, a flat bottom container substrate nest to couple a flat bottom container substrate, and a flat substrate nest to couple a media substrate.

6. A system, comprising:
a stage coupled to a rail system to move the stage along a first plane and a second plane of a base enclosure;
a fastener coupled to the stage to removably couple a plurality of different substrate nest types to the stage; and
an alignment feature to align each of the plurality of different substrate nest types with the stage and a microfluidic dispenser, wherein the microfluidic dispenser is adjustable along a third plane based on a substrate nest type among the plurality of different substrate nest types coupled to the stage, wherein the plurality of different substrate nest types include a corresponding latch to couple a substrate to a corresponding substrate nest of the plurality of different substrate nest types.

7. The system of claim 6, wherein the microfluidic dispenser is adjustable along the third plane to alter a distance between the microfluidic dispenser and a substrate nest of the substrate nest type coupled to the stage.

8. The system of claim 6, wherein the fastener includes an aperture to receive a screw to couple the fastener to a substrate nest of the substrate nest type to the stage.

9. The system of claim 6, wherein the stage includes an aperture to receive a plurality of dowel pins.

10. The system of claim 9, wherein the plurality of dowel pins act as the alignment feature to align a substrate nest of the substrate nest type with the microfluidic dispenser.

11. A dispenser system, comprising:
a stage coupled to a rail system to move the stage in a first direction and a second direction across a platform;
a retention device coupled to the stage;
a plurality of alignment features coupled to a corresponding plurality of apertures of the stage; and
a removable substrate nest coupled to the retention device and aligned with a microfluidic dispense head by the plurality of alignment features.

12. The dispenser system of claim 11, wherein the plurality of alignment features align a plurality of substrates on the removable substrate nest with particular locations to receive fluid dispensed by the microfluidic dispense head.

13. The dispenser system of claim 11, wherein the microfluidic dispense head is adjustable in a third direction to adjust a distance between the microfluidic dispense head and the removable substrate nest.

14. The dispenser system of claim 11, comprising a substrate holder coupled to the removable substrate nest to align a substrate at a particular location on the removable substrate nest.

15. The dispenser system of claim 11, wherein the removable substrate nest is to couple a substrate, and wherein the plurality of alignment features are to align the substrate, as coupled to the removable substrate nest, to receive the fluid dispensed by the microfluidic dispense head.

16. The dispenser system of claim 11, wherein the retention device includes a removable fastener that couples the substrate nest to the stage, the removable fastener including a first fastener coupled to the stage and a second fastener coupled to the substrate nest, wherein the first fastener and the second fastener interact to couple the substrate nest to the stage.

* * * * *